March 3, 1953  D. A. STENHOUSE  2,630,192
WHEEL CHOCK
Filed Dec. 21, 1950
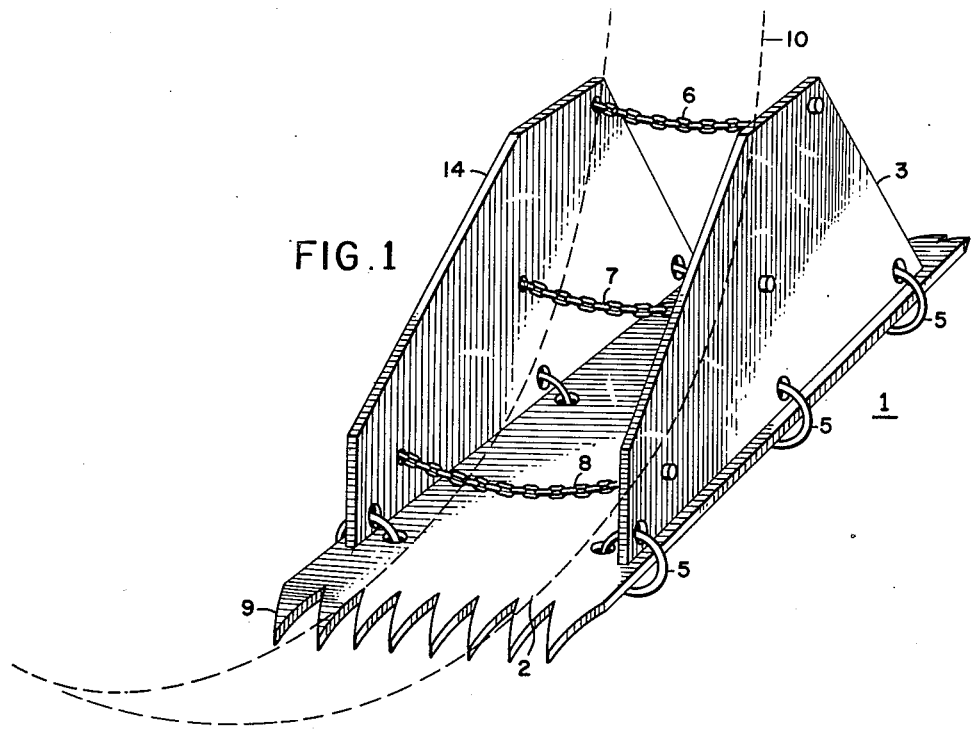
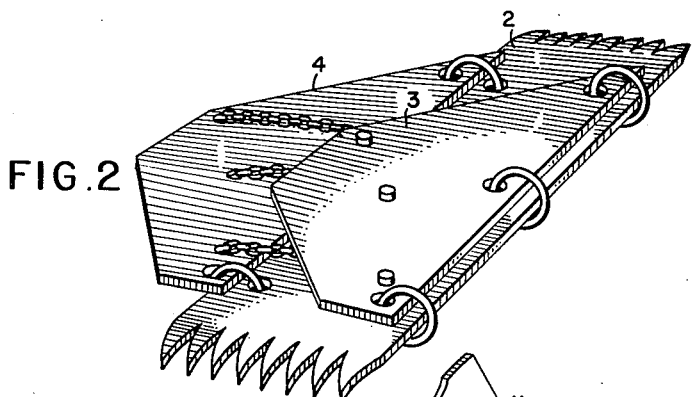
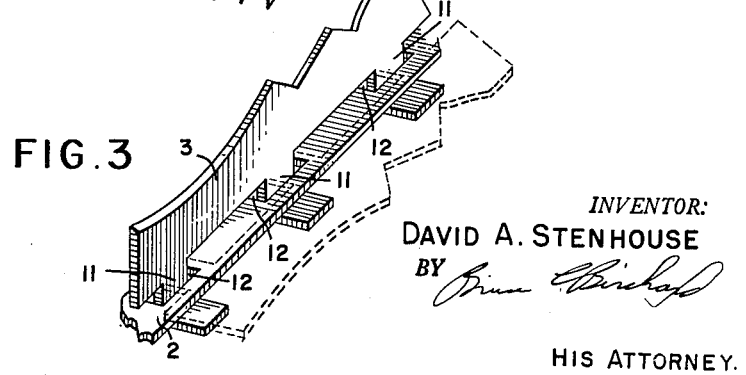
INVENTOR:
DAVID A. STENHOUSE
BY
HIS ATTORNEY.

Patented Mar. 3, 1953

2,630,192

UNITED STATES PATENT OFFICE 2,630,192

WHEEL CHOCK

David A. Stenhouse, Cook County, Ill.

Application December 21, 1950, Serial No. 201,936

3 Claims. (Cl. 188—32)

This invention relates to accessories for wheeled vehicles and more particularly to chocks to be used in retaining wheeled vehicles in fixed positions.

When wheeled vehicles such as passenger automobiles and the like are being repaired or loaded it is often essential to the safety of persons working around the vehicle and to the vehicle itself that it should not roll or slide forward or backward or slide sidewards. For example, when semi-trailers are being loaded at a loading dock it is quite essential that the trailer maintain a fixed position with respect to the dock so that the cargo may be loaded with ease and safety. As a result of irregularities or inclines in the surface upon which the wheels of the trailer are resting it may have a tendency to move away from the dock during a loading operation and any such movement might cause injury to cargo or personnel. A similar problem arises when such a vehicle becomes disabled on the highways, particularly where such highways are not precisely horizontal. Correspondingly, in the operation of passenger vehicles it is frequently necessary to change tires or perform other operations in connection with the wheels of the vehicle and these problems not infrequently arise on hills or other inclines. In all such cases it is quite essential that the vehicle remain stable.

Various forms of wheel chocks are available and those used range from wedge-shaped blocks of wood, such as are supplied with certain passenger automobiles, to rigid metal chocks which are less subject to deterioration than the wooden ones. As a matter of fact, it is not uncommon for the chock to take the form of a simple rock when the situation is of an emergency variety. All of these devices, while providing some degree of stability for the wheeled vehicle with which they are used, are subject to a number of frailties. Among other things, there is little to prevent sidewise slippage or even rotational slippage of the wheel. If one is changing the wheel of a passenger vehicle, for example, and such sidewise or rotational slippage occurs severe injury of the person repairing the vehicle may result. Furthermore, the rigid chocks of the prior art are bulky and, hence, there is some tendency to refrain from taking them in the vehicle and they are often missing when needed most.

It is an object of this invention to provide an improved chock for wheeled vehicles.

It is a further object of this invention to provide an improved wheel chock which, to all intents and purposes, eliminates sidewise and rotational slippage of the wheel of the vehicle with which the chock is associated.

An additional object of this invention is to provide an improved wheel chock which is compact and may be easily handled even by one not mechanically inclined.

In accordance with the invention there is provided a chock comprising a base portion and a pair of side portions hingedly connected to the base portion and linked to each other at points along the circumference of a circle having a diameter approximating the diameter of the wheel to be blocked by means of flexible elements, such as by chains. The uppermost of such linking elements is made slightly shorter than the remaining elements so that upon any tendency for rotation of the wheel the frictional contact between the wheel and the uppermost linking element draws the sides of the chock into tighter contact with the sides of the wheel and rotation of the wheel is prevented. The base of the chock may be provided with downward extending serrated portions to increase the frictional force between the base and the surface on which it is resting.

The features of the present invention which are believed to be new are set forth with particularity in the appended claims. The invention itself, however, together with further objects and advantages thereof may best be understood by reference to the following description when taken in conjunction with the accompanying drawing, in which:

Figure 1 is a perspective view of the chock in operational contact with a wheel, Figure 2 is a perspective view showing the chock in its compact collapsed condition, and Figure 3 is a perspective view of a portion of a chock showing a simplified construction for obtaining hinge action between the sides of the chock and the base.

In Figure 1 chock 1 comprises a base portion 2 hingedly connected to sides 3 and 4 by means of rings 5, for example. Side 3 is linked to side 4 by elements 6, 7 and 8 which are flexible and may be, for example, chains. When sides 3 and 4 are spread to maximum separation, linking element 6 is taut but elements 7 and 8 are not. Linking elements 6, 7 and 8 are secured at their respective ends to points on sides 3 and 4 by welding, bolting or the like. Those points on each side lie along the circumference of a circle having a diameter approximating that of the wheel to be blocked, although this feature is not critical. Base 2 may have depending serrated edges 9 which improve the frictional contact between the base 2 and the surface on which it is resting. Such a serrated edge is useful when the surface is iced. For optimum performance the length of linking element 6 should approximate the width of the wheel in conjunction with which this chock is to be used, although this length is not critical as long as it is greater than the width of the wheel. This means, of course, that linking elements 7 and 8 will be slightly longer than the width of the wheel to be blocked.

With the chock so constructed, in operation it is placed with linking element 6 in contact with the periphery of the wheel and sides 3 and 4 of the chock in contact with the sides of the wheel being blocked. If the wheel 10 tends to rotate it acts first upon linking element 6 because that element is substantially taut and as a result of the hinged connection of sides 3 and 4 with base 2 those sides are pulled towards each other, which effects a clamping action on wheel 10 and materially increases the frictional forces which must be overcome for wheel 10 to rotate. Furthermore, if wheel 10 tends to slip sidewise the upper portion of one side and the lower portion of the other come in firm contact with the sides of the wheel and prevent any material sidewise motion. Depending serrations 9 prevent translation of the entire chock upon pressure from the wheel even under iced conditions. The wheel is thus prevented from both translational and rotational motion.

In Figure 2 sides 3 and 4 are shown lying substantially in the plane of base 2. Such is the relation of these portions of the chock when it is in condition for storage. It is clear from Figure 2 that the unit becomes very compact and that several of these units could be stored in a small space in this collapsed state. Such compactness and ease of storage is, of course, important in passenger and commercial vehicles alike. It is to be noted that all of the elements of the chock remain interconnected in proper order in this collapsed condition so that there is great ease in putting the chock to use once it is needed and there is no problem of searching for missing parts. This is especially important when the user is not mechanically inclined.

In Figure 3 an alternative method is shown for realizing a hinged connection between base 2 and sides 3 and 4. In this structure rings 5 of Figure 1 have been supplanted by a pair of depending L-shaped legs 11 which may be formed integrally with each side 3 and 4. These legs cooperate with slots 12 so as to provide a hinged connection between base 2 and sides 3 and 4. In this case, the chock may be partially disassembled by folding sides 3 and 4 in the same direction and disengaging legs 11 from the cooperating slots 12 first on one side of the base and then on the other. Slots 12 are made of such size that legs 11 may be easily disengaged therefrom but not so large that legs 11 will not have a positive connection with base 12 during use. This structure might be slightly less expensive to build than that shown in Figures 1 and 2 and would be slightly more compact when collapsed for storage. It should be recognized that other methods for hinging sides 3 and 4 to base 2 are available, as for example, a continuous hinge along the length of the junction between sides 3 and 4 and base 2.

Thus, there is provided in accordance with the objects of this invention an improved wheel chock which is positive in its action yet simple to construct and compact to store. The use of a chock such as is the subject of this invention will materially increase the safety of personnel and cargo associated with wheeled vehicles without demanding undue space for storage in the vehicle or mechanical skill on the part of the user.

While a particular embodiment of the invention has been shown and described modifications may be made and it is intended in the appended claims to cover all such modifications as fall within the true spirit and scope of the invention.

I claim:

1. A chock for blocking a wheel including: a base portion having slots therein, a pair of side portions having L-shaped leg portions depending therefrom and adapted to engage the slots in said base portion, and at least one flexible linking element connected between said side portions.

2. A wheel chock according to claim 1 in which a plurality of chains are connected between said side portions at points lying along the circumference of a circle having a diameter approximating that of a wheel to be blocked.

3. A chock for blocking a wheel of a vehicle, including: a base portion, a first side portion hinged to said base portion, a second side portion hinged to said base portion independently of said first side portion, and a plurality of flexible linking elements of substantially fixed length connected between said sides at points remote from the periphery of said sides and lying along the circumference of a circle of diameter approximating that of the wheel to be blocked, the uppermost of said elements having a length such that, with the side portions in upright position, the pressure of a wheel therebetween and engaging said linking element will draw said side portions into contact with the edges of the wheel.

DAVID A. STENHOUSE.

REFERENCES CITED

The following references are of record in the file of this patent:

UNITED STATES PATENTS

| Number | Name | Date |
|---|---|---|
| 1,035,381 | Moss | Aug. 13, 1912 |
| 1,149,006 | Weaver | Aug. 3, 1915 |
| 2,252,878 | Bella et al. | Aug. 19, 1941 |
| 2,481,065 | Auten | Sept. 6, 1949 |
| 2,507,037 | Miller | May 9, 1950 |

FOREIGN PATENTS

| Number | Country | Date |
|---|---|---|
| 372,816 | Italy | Aug. 11, 1939 |
| 345,480 | Germany | Dec. 12, 1921 |